(12) United States Patent
Woodson

(10) Patent No.: US 11,805,102 B2
(45) Date of Patent: Oct. 31, 2023

(54) REMOTE MANAGEMENT OF SOFTWARE ON PRIVATE NETWORKS

(71) Applicant: Red Hat, Inc., Raleigh, NC (US)

(72) Inventor: Matt Albert Woodson, Raleigh, NC (US)

(73) Assignee: RED HAT, INC., Raleigh, NC (US)

( * ) Notice: Subject to any disclaimer, the term of this patent is extended or adjusted under 35 U.S.C. 154(b) by 454 days.

(21) Appl. No.: 17/168,648

(22) Filed: Feb. 5, 2021

(65) Prior Publication Data

US 2022/0255902 A1 Aug. 11, 2022

(51) Int. Cl.
*H04L 9/40* (2022.01)
*H04L 9/32* (2006.01)
*H04L 9/30* (2006.01)

(52) U.S. Cl.
CPC ........ *H04L 63/0281* (2013.01); *H04L 9/3073* (2013.01); *H04L 9/321* (2013.01); *H04L 63/029* (2013.01); *H04L 63/0263* (2013.01)

(58) Field of Classification Search
CPC ... H04L 63/0281; H04L 9/3073; H04L 9/321; H04L 63/0263; H04L 63/029
USPC .......................................................... 726/12
See application file for complete search history.

(56) References Cited

U.S. PATENT DOCUMENTS

| | | | |
|---|---|---|---|
| 10,511,584 B1 * | 12/2019 | Baer ..................... | H04L 63/029 |
| 10,645,172 B1 * | 5/2020 | Hussain .................. | H04L 67/10 |
| 11,133,933 B1 * | 9/2021 | Grund ................. | G06F 16/2471 |
| 11,323,477 B1 * | 5/2022 | Kumar .................. | H04L 63/168 |
| 11,442,755 B1 * | 9/2022 | Patimer .................. | H04L 63/08 |
| 2014/0317686 A1 * | 10/2014 | Vetillard ................ | G06F 21/74 726/2 |
| 2014/0351573 A1 * | 11/2014 | Martini ............... | H04L 63/0209 713/153 |
| 2016/0226874 A1 * | 8/2016 | Wiest .................... | H04L 67/141 |
| 2019/0306231 A1 * | 10/2019 | Shimoga Manjunatha ................. | H04L 61/255 |
| 2019/0356693 A1 * | 11/2019 | Cahana ............... | H04L 67/1036 |
| 2020/0412651 A1 * | 12/2020 | Patidar ................ | H04L 63/0471 |

OTHER PUBLICATIONS

Hall; Telekube Offers Remotely-Managed 'Private SaaS' Kubernetes, Nov. 23, 2016; 13 pgs; Retreived from https://thenewstack.io/telekube-offers-remotely-managed-private-saas-kubernetes/on Dec. 4, 2020.

(Continued)

*Primary Examiner* — Thanh T Le
(74) *Attorney, Agent, or Firm* — K&L Gates LLP

(57) ABSTRACT

Systems and methods for remote management of software on private networks are generally described. In various examples, a cluster of compute instances are deployed by a cloud compute service provider. A first compute pod may be deployed among the cluster of compute instances. The first compute pod may be configured to execute a secure shell daemon (SSHD) network proxy. The first compute pod may be configured to open ports to allow access to the cluster of compute instances by an authorized administrative user. In some examples, a connection may be established between a first computing device executing a secure shell (SSH) process and the SSHD network proxy of the first compute pod. Data may be sent from the first computing device to at least one compute instance of the cluster of compute instances using the connection.

20 Claims, 7 Drawing Sheets

(56) References Cited

OTHER PUBLICATIONS

Madamanchi; How to SSH Into a Kubernetes Pod From Outside the Cluster; 2020; 5 pgs; Retreived from https://medium.com/better-programming/how-to-ssh-into-a-kubernetes-pod-from-outside-the-cluster-354b4056c42b on Dec. 4, 2020.
Author unknown; SSH Keys; 2020; 10 pages; SSH Academy; Retreived from https://www.ssh.com/ssh/key/ on Dec. 4, 2020.

* cited by examiner

REMOTE MANAGEMENT OF SOFTWARE ON PRIVATE NETWORKS

BACKGROUND

The present disclosure generally relates to shared computing environments such as single or multi-tenant cloud environments. Shared computing environments, whether public or privately implemented within an organization, typically employ orchestration of the deployment of isolated guest computing instances that perform the computing tasks in the networked computer systems. In computer systems, it may be advantageous to scale application deployments by using isolated guests such as virtual machines and containers that may be used for creating hosting environments for running application programs. Typically, isolated guests such as containers and virtual machines may be launched to provide extra compute capacity of a type that the isolated guest is designed to provide. Isolated guests enable a programmer to quickly scale the deployment of applications to the volume of traffic requesting the applications, and may be deployed in a variety of hardware environments. Multiple guests may also be clustered together to perform a more complex function than the respective containers are capable of performing individually. Many applications require persistent storage to store a current execution state and therefore persistent storage may be provisioned and allocated to the guests executing in a computing environment.

SUMMARY

The present disclosure provides a new and innovative system, methods and apparatus enabling remote management of software deployed on private networks. In various examples, the methods may include deploying a cluster of compute instances with a cloud compute service provider. In some examples, a first compute pod may be deployed among the cluster of compute instances. The first compute pod may be configured to execute a secure shell daemon (SSHD) network proxy. In some examples, the first compute pod may be further configured to open ports to allow access to the cluster of compute instances by an authorized administrative user. In at least some examples, a connection may be established between a first computing device executing a secure shell (SSH) process and the SSHD network proxy of the first compute pod. In some other examples data may be sent from the first computing device to at least one compute instance of the cluster of compute instances using the connection.

In another example, a system may include a cloud service comprising a plurality of computing resources and an administrator device. In some examples, the administrator device may include at least one processor and non-transitory computer-readable memory. The non-transitory computer-readable memory may store instructions that, when executed by the at least one processor, are configured to deploy a cluster of compute instances on the plurality of computing resources. In some examples, the non-transitory computer-readable memory may store further instructions that, when executed by the at least one processor, are configured to deploy a first compute pod among the cluster of compute instances. In various cases, the first compute pod may be configured to execute a secure shell daemon (SSHD) network proxy. In some examples, the first compute pod may be configured to open ports to allow access to the cluster of compute instances by the administrator device. The non-transitory computer-readable memory may store further instructions that, when executed by the at least one processor, are configured to establish a connection with the SSHD network proxy of the first compute pod. In some examples, the non-transitory computer-readable memory may store instructions that, when executed by the at least one processor, are configured to send data from the administrator device to at least one compute instance of the cluster of compute instances using the connection.

In yet another example, a method of establishing a connection by a first computing device to a private network is generally described. In some examples, the first computing device may execute an application effective to establish a secure shell (SSH) tunnel with a secure shell daemon (SSHD) network proxy. The SSHD network proxy may be executed by a first compute pod among a cluster of compute instances. In various examples, the method may include connecting to the SSHD network proxy executing on the first compute pod among the cluster of compute instances via the SSH tunnel. In at least some other examples, the method may further include sending data from the first computing device to at least one compute instance of the cluster of compute instances using the SSH tunnel.

Additional features and advantages of the disclosed method and apparatus are described in, and will be apparent from, the following Detailed Description and the Figures.

DETAILED DESCRIPTION OF EXAMPLE EMBODIMENTS

Figure 1:
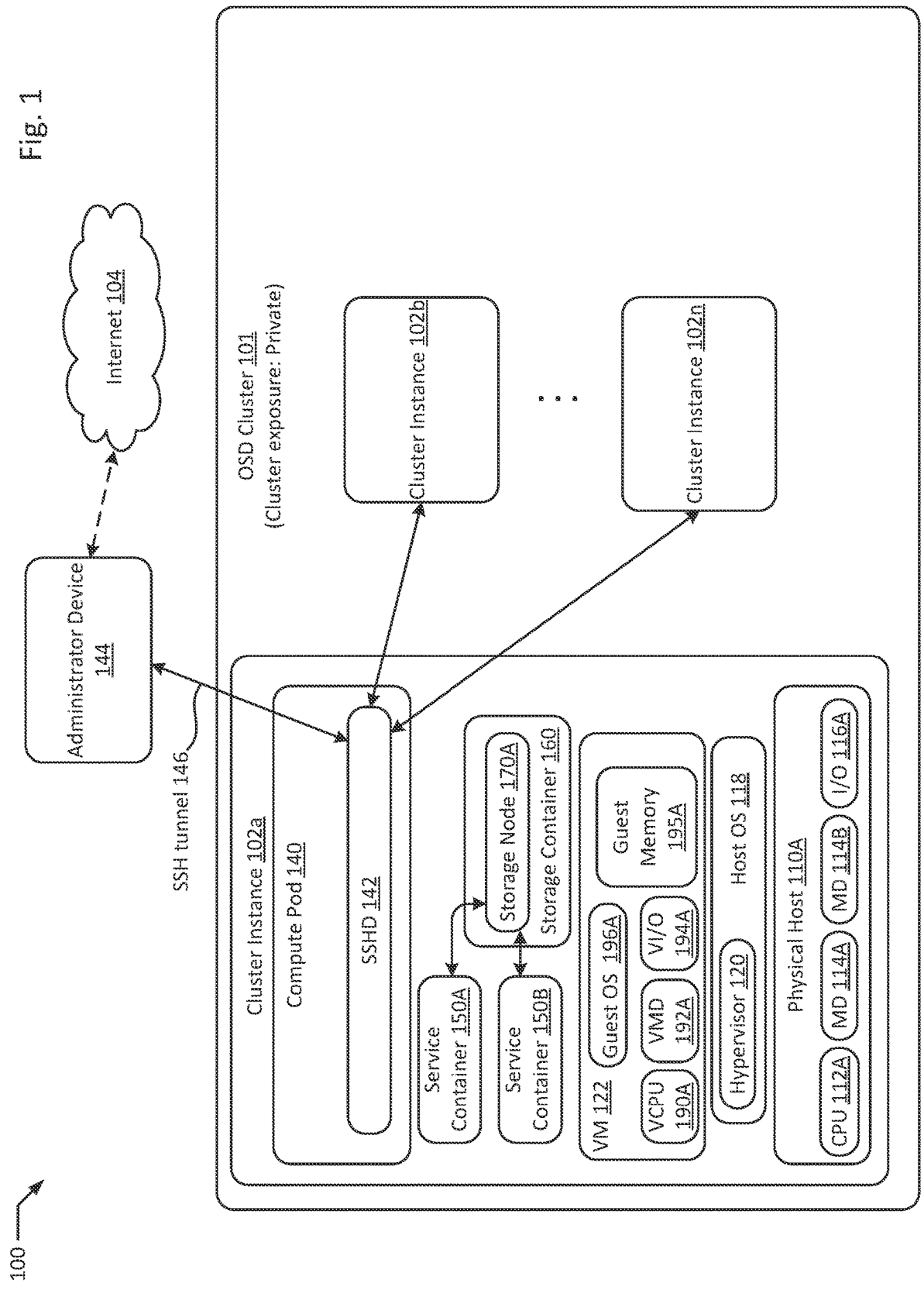
FIG. 1 is a block diagram of a system including an administrator device configured in communication with a private network, according to various examples of the present disclosure.

In computer systems, virtualization may be implemented to allow for flexible scaling of computing resources, for example, in a cloud environment. In an example, a virtual machine ("VM") may be a robust simulation of an actual physical computer system utilizing a hypervisor to allocate physical resources to the virtual machine. In some examples, a container based virtualization system, for example, one managed by a container manager such as Red Hat® OpenShift® executing a containerization runtime environment such as Docker® may be advantageous, as container based virtualization systems may be lighter weight than systems using virtual machines with hypervisors. In the case of containers, a container will often be hosted on a physical host or virtual machine that already has an operating system executing, and the container may be hosted on the operating system of the physical host or VM. In large scale implementations, container schedulers, such as those included in container orchestrators (e.g., Red Hat® OpenShift®, Kubernetes®, Docker Swarm®), generally respond to frequent container startups and cleanups with low latency. Containers may enable wide spread, parallel deployment of computing power for specific tasks. In a typical example, a container may be instantiated to process a specific task and reaped after the task is complete.

Software as a service (SaaS) is a software offering where a service provider hosts applications and makes them available to customers over the Internet. These applications can be multi-tenant or single tenant. Multi-tenant SaaS offerings typically share the same computing resources with customers connecting to the same hosted application. In single tenant environments, each customer connects to their own instance of the application.

These applications can be hosted in data centers and are frequently hosted on cloud service providers like Amazon Web Services (AWS) and Google Cloud Platform (GCP). In some cases, a first entity (that may be different from the customer that wants to deploy the application) deploys and manages the applications on a third party cloud service provider. Often, an application's communication endpoints are not exposed directly to the Internet for security purposes. When these applications are not exposed to the Internet, the applications are accessed by the customer using a private network. Private networks are configured by the customer, and may overlap with other instances of the applications executed by the service provider.

Applications that lack an exposed endpoint to the Internet present a challenge for accessing and/or managing the applications when the administrator is a third party with respect to the cloud service provider. For example, an application may be deployed by a first entity who may be responsible for managing the deployment of the application and/or maintaining the application. However, the application may be deployed on a private network controlled by a second entity, different from the first (e.g., by a third party cloud service provider). Described herein are systems and techniques effective to provide secure communication with private clusters to manage and/or maintain software deployed thereon.

For example, OpenShift® Dedicated (OSD) is a SaaS offering managed OpenShift clusters deployed on third party cloud services. Site reliability engineers (SREs) are responsible for managing OSD clusters. OSD clusters are unique, customized, and single-tenant. Each OSD cluster has an individual network configuration that is configured by the customer (e.g., the entity requesting the OSD deployment to execute the desired software) during install. The customer may select whether the cluster is public or private. The public/private distinction refers to whether the cluster has endpoints that are accessible from the Internet. Accordingly, public clusters have endpoints that are exposed to the Internet, allowing access to the public cluster. Conversely, private clusters may not have endpoints exposed via the Internet and may therefore be difficult to access. It is common for customers to create "private" clusters that do not expose any endpoints on the Internet, and which are accessed privately.

Additionally, OSD customers typically set their own internet protocol (IP) addresses for a given cluster in order to provide communication between the cluster and resources/networks managed by the customer. Accordingly, SREs are unable to define the IP addresses for an OSD cluster. This can result in different OSD clusters having overlapping, customer-defined IP addresses, rendering it difficult for an administrator device to securely communicate with and/or manage the appropriate cluster. In order to manage the OSD cluster, the administrator (e.g., the SRE) needs access to the network on which the software is executing.

In order to overcome these challenges, a compute pod is deployed by the administrator on the private cluster. The compute pod is configured to execute a secure shell daemon (SSHD) network proxy. A proxy is a service that acts as a gateway between a local network and a remote network. On the local network (e.g., a network comprising an administrator device), the administrator may send traffic destined to the remote network (e.g., the private cluster) to the SSHD network proxy. The proxy is authenticated to the cluster and is configured to communicate with the private cluster in order to facilitate traffic flow between the administrator device's network and the private cluster. SSH may be authenticated between the administrator device and the SSHD network proxy executing on the compute pod in the private cluster. Thereafter, encrypted network traffic between the administrator device and the private cluster may travel through the securely-established SSH tunnel, allowing administrators to securely access the remote network of the private cluster.

FIG. 1 is a block diagram of a system 100 including an administrator device 144 configured in communication with a private network (e.g., OSD cluster 101), according to various examples of the present disclosure. In the example, depicted in FIG. 1, the cluster instance 102a may include one or more physical host(s), including physical host 110A. Physical host 110A may in turn include one or more physical processor(s) (e.g., CPU 112A) communicatively coupled to one or more memory device(s) (e.g., MDs 114A-B) and one or more input/output device(s) (e.g., I/O 116A). As used herein, physical processor or processors 112A refer to devices capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions and/or threads. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU").

As discussed herein, memory devices 114A-B refer to volatile or non-volatile memory devices, such as RAM, ROM, EEPROM, or any other device capable of storing data. In an example, memory devices 114A may be persistent storage devices such as hard drive disks ("HDD"), solid state drives ("SSD"), and/or persistent memory (e.g., Non-Volatile Dual In-line Memory Module ("NVDIMM")). Memory devices 114A-B may additionally include replication of data to prevent against data loss due to a failure in any one device. This replication may be implemented through, for example, a redundant array of independent disks ("RAID") setup. RAID arrays may be designed to increase performance, to provide live data backup, or a combination of both. As discussed herein, I/O device(s) 116A refer to devices capable of providing an interface between one or more processor pins and an external device, the operation of which is based on the processor inputting and/or outputting binary data. CPU(s) 112A may be interconnected using a variety of techniques, ranging from a point-to-point processor interconnect, to a system area network, such as an Ethernet-based network. Local connections within physical hosts 110A, including the connections between processors 112A and memory devices 114A-B and between processors 112A and I/O device 116A may be provided by one or more local buses of suitable architecture, for example, peripheral component interconnect (PCI).

In an example, physical host 110A may run one or more isolated guests, for example, VM 122, which may in turn host additional virtual environments (e.g., VMs and/or containers). In an example, a container (e.g., storage container 160, service containers 150A-B) may be an isolated guest using any form of operating system level virtualization, for example, Red Hat® OpenShift®, Docker® containers, chroot, Linux®-VServer, FreeBSD® Jails, HP-UX® Containers (SRP), VMware ThinApp®, etc. Storage container 160 and/or service containers 150A-B may run directly on a host operating system (e.g., host OS 118) or run within another layer of virtualization, for example, in a virtual machine (e.g., VM 122). In an example, containers that perform a unified function may be grouped together in a container cluster that may be deployed together (e.g., in a Kubernetes® pod). For example, compute pod 140 may be deployed on cluster instance 102a and may be configured to execute SSHD 142 as a network proxy. In an example, a given service may require the deployment of multiple VMs, containers and/or pods in multiple physical locations. In an example, VM 122 may be a VM executing on physical host 110A.

Cluster instance 102a may run one or more VMs (e.g., VMs 122), by executing a software layer (e.g., hypervisor 120) above the hardware and below the VM 122, as schematically shown in FIG. 1. In an example, the hypervisor 120 may be a component of respective host operating system 118 executed on physical host 110A, for example, implemented as a kernel based virtual machine function of host operating system 118. In another example, the hypervisor 120 may be provided by an application running on host operating system 118A. In an example, hypervisor 120 may run directly on physical host 110A without an operating system beneath hypervisor 120. Hypervisor 120 may virtualize the physical layer, including processors, memory, and I/O devices, and present this virtualization to VM 122 as devices, including virtual central processing unit ("VCPU") 190A, virtual memory devices ("VMD") 192A, virtual input/output ("VI/O") device 194A, and/or guest memory 195A. In an example, another virtual guest (e.g., a VM or container) may execute directly on host OSs 118 without an intervening layer of virtualization.

In an example, a VM 122 may be a virtual machine and may execute a guest operating system 196A which may utilize the underlying VCPU 190A, VMD 192A, and VI/O 194A. Processor virtualization may be implemented by the hypervisor 120 scheduling time slots on physical CPUs 112A such that from the guest operating system's perspective those time slots are scheduled on a virtual processor 190A. VM 122 may run on any type of dependent, independent, compatible, and/or incompatible applications on the underlying hardware and host operating system 118. The hypervisor 120 may manage memory for the host operating system 118 as well as memory allocated to the VM 122 and guest operating system 196A such as guest memory 195A provided to guest OS 196A. In an example, storage container 160 and/or service containers 150A, 150B are similarly implemented.

In an example, in addition to distributed storage provided by storage container 160, a storage controller may additionally manage storage in dedicated storage nodes (e.g., NAS, SAN, etc.). In an example, a storage controller may deploy storage in large logical units with preconfigured performance characteristics (e.g., storage nodes 170A). In an example, access to a given storage node (e.g., storage node 170A) may be controlled on an account and/or tenant level. In an example, a service container (e.g., service containers 150A-B) may require persistent storage for application data, and may request persistent storage with a persistent storage claim to an orchestrator of the OSD cluster 101. In the example, a storage controller may allocate storage to service containers 150A-B through a storage node (e.g., storage nodes 170A) in the form of a persistent storage volume. In an example, a persistent storage volume for service containers 150A-B may be allocated a portion of the storage capacity and throughput capacity of a given storage node (e.g., storage nodes 170A). In various examples, the storage container 160 and/or service containers 150A-B may deploy compute resources (e.g., storage, cache, etc.) that are part of a compute service that is distributed across multiple clusters (not shown in FIG. 1).

In FIG. 1, administrator device 144 may be configured in communication with the Internet 104. However, OSD cluster 101 may be a private network without exposed endpoints (e.g., without endpoints exposed to Internet 104). In the example depicted in FIG. 1, OSD cluster 101 may comprise cluster instances 102a, 102b, . . . , 102n. Each cluster instance may be a virtual and/or a physical computing resource configured to communicate with one or more other cluster instances of OSD cluster 101 on the private network. In some examples, a customer may deploy one or more applications on the OSD cluster 101 (e.g., as an OpenShift® deployment). The applications may be managed by an administrator using administrator device 144, as described in various examples herein.

In some examples, administrator device 144 may be responsible for managing one or more software applications deployed on OSD cluster 101. However, if OSD cluster 101 is deployed on computing resources provided by a third party cloud services provider (e.g., a third party with respect to administrator device 144), administrator device 144 may be unable to communicate with OSD cluster 101 since OSD cluster 101 is a private cluster lacking exposed endpoints.

Accordingly, when OSD cluster 101 is deployed, administrator device 144 may send instructions to deploy compute pod 140 that is effective to execute an SSHD 142 proxy network. As depicted by the double-headed arrows in FIG. 1, the SSHD 142 may authenticate with the other cluster instances 102b, . . . , 102n of the OSD cluster 101 (e.g., using an authentication pod of OSD cluster 101) to enable communication between the SSHD 142 network proxy and the other cluster instances of the OSD cluster 101. Additionally, administrator device 144 may execute a client-side process effective to establish an SSH tunnel 146 with the SSHD 142 network proxy. Administrator device 144 may use an SSH authentication technique to authenticate the SSH tunnel 146 with the compute pod 140. Any desired SSH authentication technique may be used (e.g., public/private key pairs, username and password, etc.) to authenticate the SSH tunnel 146. In various examples, the compute pod 140 may move to different instances within the OSD cluster 101, as needed in order to balance compute load. A load balancer of OSD cluster 101 (not pictured in FIG. 1) may direct incoming traffic to the appropriate instance where compute pod 140 is executing.

The compute pod 140 may be configured during deployment to allow authorized users to connect to it. In various examples, administrator configuration data used to configure compute pod 140 may be provided by administrator device 144. The compute pod 140 may open the required firewall IP and ports to allow access by authorized IP addresses to the compute pod 140.

Thereafter, administrator device 144 may initiate a maintenance task (or may otherwise communicate with compute pod 140) by launching SSH with the appropriate flags to initialize the SSH tunnel 146. SSH on the administrator device 144 connects to the SSHD 142 network proxy on the compute pod 140. SSH authentication takes place to allow the administrator device 144 to fully establish SSH tunnel 146. After successful authentication, the administrator device 144 may communicate with cluster instances 102a, 102b, . . . , 102n on the private network of OSD cluster 101 using the SSH tunnel 146. For example, data may be sent to and received from cluster instances 102a, 102b, . . . , 102n via the SSH tunnel 146 and via the SSHD 142 network proxy.

When the compute pod 140 is no longer needed, it may be uninstalled and deconfigured from the OSD cluster 101 by deleting the firewall rules that were created for the compute pod 140, removing the compute pod 140 from the OSD cluster 101 (stopping all compute pod 140 processes from executing), and deleting the SSH software.

As used herein, a pod represents a set of software processes that are grouped and run together within a cluster. Advantageously, Pods running in OpenShift allow these processes to be moved together within the cluster and still be accessible. In the example of FIG. 1, SSHD 142 is run as a pod (e.g., compute pod 140), and can be moved to other appropriate hosts in the cluster, while maintaining the connectivity with cluster instances 102a, 102b, . . . 102n and with administrator device 144.

Figure 2:
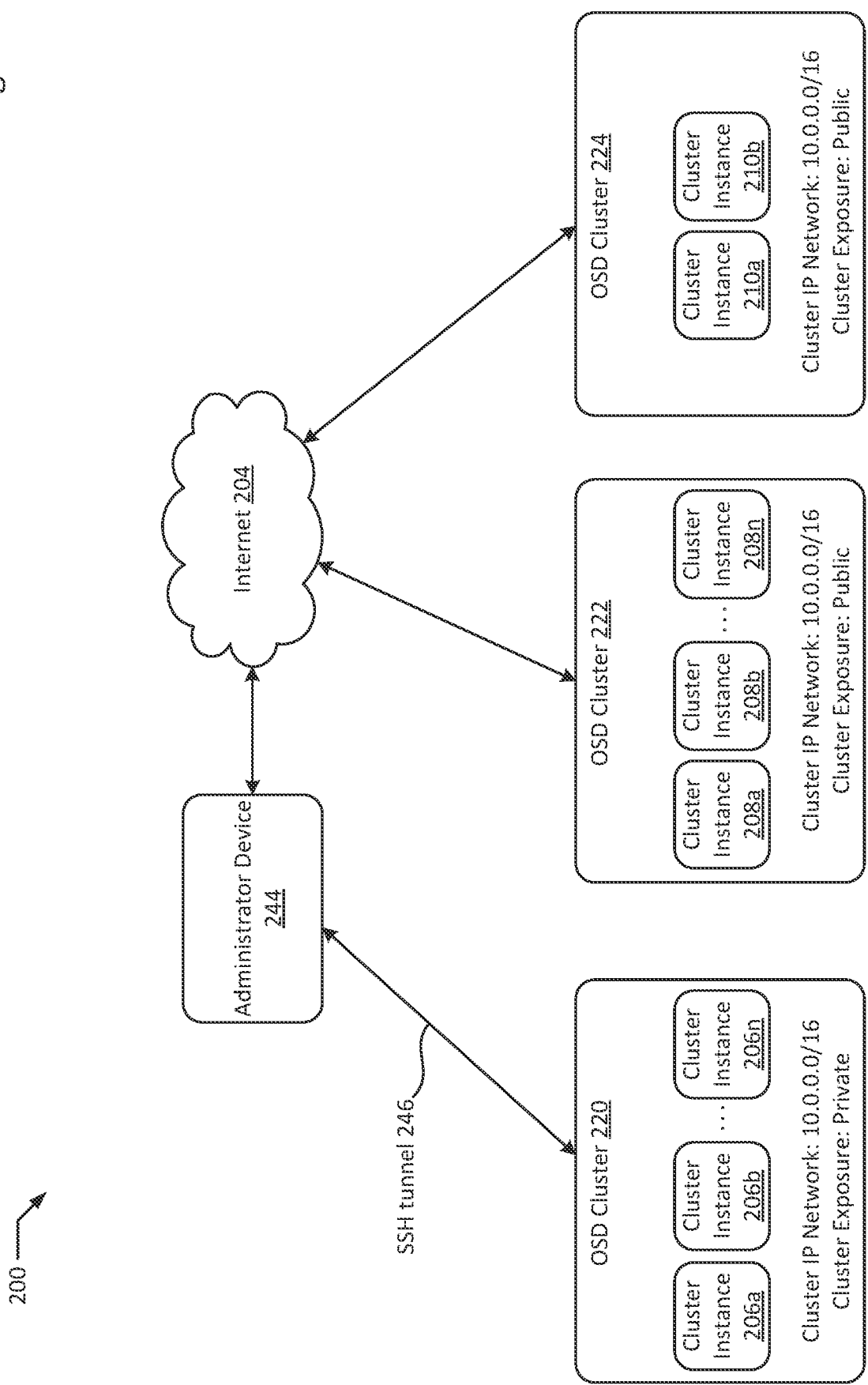
FIG. 2 is a block diagram illustrating communication between various clusters of compute instances, in accordance with various aspects of the present disclosure.

FIG. 2 is a block diagram 200 illustrating communication between various clusters of compute instances, in accordance with various aspects of the present disclosure. In the example depicted in FIG. 2, OSD clusters 220, 222, and 224 may be separate OSD clusters each with a number of different cluster instances. For example, OSD cluster 220 may include cluster instances 206a, 206b, . . . , 206n. OSD cluster 222 may include cluster instances 208a, 208b, . . . , 208n, and OSD cluster 224 may include cluster instances 210a and 210b. Cluster instances (e.g., cluster instances 206a . . . 206n, 208a . . . 208n, 210a and 210b) that are grouped together within an OSD cluster may be physical and/or virtual computing resources configured in communication with one another within the OSD cluster.

OSD cluster 222 includes endpoints that are exposed to internet 204. Accordingly, the cluster exposure of OSD cluster 222 is "Public." Accordingly, an administrator device 244 may communicate with cluster instances 208a, 208b, . . . , 208n via the Internet 204. Similarly, OSD cluster 224 includes endpoints that are exposed to internet 204. Accordingly, the cluster exposure of OSD cluster 224 is "Public." Accordingly, an administrator device 244 may communicate with cluster instances 210a and 210b via the Internet 204.

OSD cluster 220 may not include endpoints that are exposed to internet 204. Accordingly, the cluster exposure of OSD cluster 220 is "Private." It may not be possible for administrator device 244 to communicate with cluster instances of OSD cluster 220 via internet 204. Additionally, when the cloud service provider hosting OSD cluster 220 is a third party with respect to the administrator device 244 (e.g., an administrator charged with maintenance and/or management of the SaaS deployment on OSD cluster 220), the administrator device 244 may not have access to the private network of OSD cluster 220.

Furthermore, since individual customers select their own IP addresses in order to enable inter-cluster communication between different systems deployed on different clusters which are controlled by the customer, there may be overlap between the cluster IP networks. As shown in the example in FIG. 2, each of OSD cluster 220, OSD cluster 222, and OSD cluster 224 have the same cluster IP network address. Accordingly, it may be difficult to route data traffic to the intended recipient cluster instance regardless of whether a cluster's exposure is public or private.

Accordingly, instead of communicating using the IP protocol via Internet 204, administrator device 244 may communicate using SSH tunnel 246. This is particularly advantageous with private networks, although the SSH tunnel 246 may also be used to communicate with publicly exposed networks when there are overlapping IP addresses (as in the example depicted in FIG. 2). As described in further detail herein, the SSH tunnel 246 may be implemented by deploying a compute pod on the relevant cluster. The compute pod may be configured to execute an SSHD proxy network. The compute pod may authenticate the SSHD proxy network with the authentication pod of the cluster so that the SSHD proxy network may communicate with the cluster instances of the cluster. Additionally, the compute pod may configure firewall settings and ports such that the compute pod may communicate with the administrator device 244. The administrator device 244 may deploy software effective to execute SSH and establish communication with the SSHD proxy network executed by the compute pod. After SSH authentication, a secure, encrypted SSH tunnel 246 may be established, enabling communication between the administrator device 244 and the instances of the cluster. In the example depicted in FIG. 2, administrator device 244 may use SSH tunnel 246 to send data to and perform management, maintenance, and/or troubleshooting tasks related to cluster instances 206a, 206b, . . . , 206n.

Figure 3:
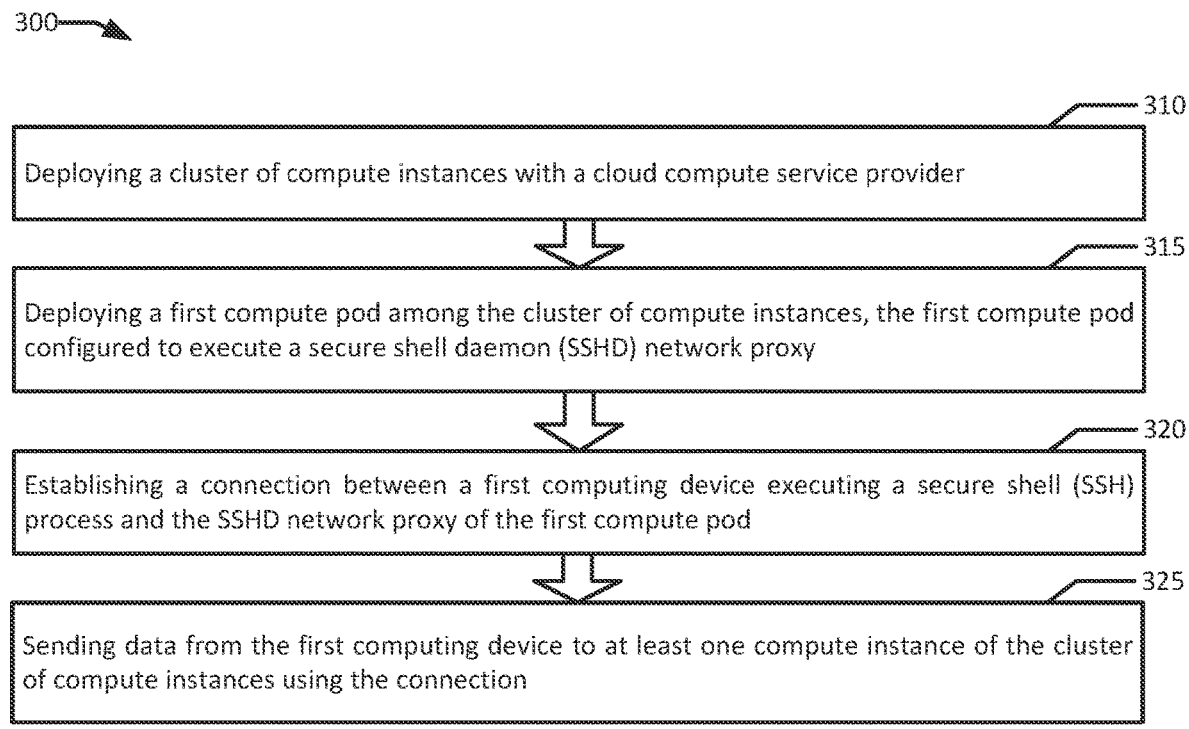
FIG. 3 is flowchart illustrating an example process for establishing a connection between a first computing device and a cluster of compute instances, according to an example of the present disclosure.

FIG. 3 is flowchart illustrating an example process 300 for establishing a connection between a first computing device and a cluster of compute instances, according to an example of the present disclosure. Although the example process 300 is described with reference to the flowchart illustrated in FIG. 3, it will be appreciated that many other methods of performing the acts associated with the process 300 may be used. For example, the order of some of the blocks may be changed, certain blocks may be combined with other blocks, blocks may be repeated, and some of the blocks described may be optional. The process 300 may be performed by processing logic that may comprise hardware (circuitry, dedicated logic, etc.), software, or a combination of both. In some examples, the actions described in the blocks of the process 300 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices.

The example process 300 includes deploying a cluster of compute instances with a cloud compute service provider (block 310). In various examples, an entity may be engaged by a customer to deploy and manage SaaS. For example, a customer may request an OSD deployment of SaaS (e.g., an SaaS deployment on OSD cluster 101). However, the entity may be separate from the cloud service providing the actual data centers and/or other cloud computing resources that constitute the cloud service. Accordingly, the entity (e.g., administrator device 144) may deploy the cluster of compute instances (e.g., the OSD cluster 101) used to provide the application(s) on a third party cloud service. For example, the cluster of cluster instances 206a, 206b, ..., 206n may be deployed as a private OSD cluster 220 (as shown in FIG. 2).

In an example, the process 300 may include deploying a first compute pod (e.g., compute pod 140) among the cluster of compute instances, where the first compute pod is configured to execute a secure shell daemon (SSHD) network proxy (block 315). The SSHD network proxy (e.g., SSHD 142) may configure firewall settings and/or open ports to allow communication with authenticated administrator devices of the entity managing the SaaS offering. Additionally, the SSHD network proxy may authenticate with other cluster instances (e.g., cluster instances 102b ... 102n) of the OSD cluster to enable communication with the private network.

In an example, the process 300 may include establishing a connection between a first computing device executing a secure shell (SSH) process and the SSHD network proxy of the first compute pod (block 320). The first computing device may be, for example, an administrator device such as administrator device 144. The first computing device may execute an SSH process (e.g., via client-side software) that is effective to initiate communication with the SSHD network proxy executed by the first compute pod. In various examples, SSH authentication may occur between the first compute pod and the first computing device. The SSH authentication may use any desired authentication technique. For example, public/private key pairs may be used to authenticate the administrator device executing SSH to the SSHD network proxy executing on the first compute pod. In another example, username and/or password credentials may be used instead of, or in addition to, public/private key pair authentication. Other authentication techniques may also be used in accordance with the various techniques described herein. After SSH authentication an SSH tunnel may be established between the client SSH process executed by the administrator device and the SSHD network proxy executed by the first compute pod on the private OSD cluster.

In an example, the process 300 may include sending data from the first computing device to at least one compute instance of the cluster of compute instances using the connection (block 325). For example, the first computing device (e.g., administrator device 144) may send data to one or more of the cluster instances (e.g., computing instances) of the private OSD cluster via the SSH tunnel. Any type of data may be sent. For example, troubleshooting instructions, executable commands, software updates, configuration tools, update requests, etc., may be sent to cluster instances in order to manage and/or maintain the SaaS offering executed by one or more of the compute instances (e.g., cluster instances 206a, 206b, ..., 206n of FIG. 2) deployed on the private OSD network. For example, administrator device 144 may be used to maintain and/or manage an SaaS deployment on a private OSD cluster (e.g., OSD cluster 101). In some examples, the administrator device 144 may execute diagnostic software that may send requests for diagnostic information and/or lists of currently executing processes to cluster instances 102a, 102b, ..., 102n of the private OSD cluster 101. The requests may be sent via the SSH tunnel 146. Similarly, response data may be sent from the clusters to the administrator device 144.

Figure 4:
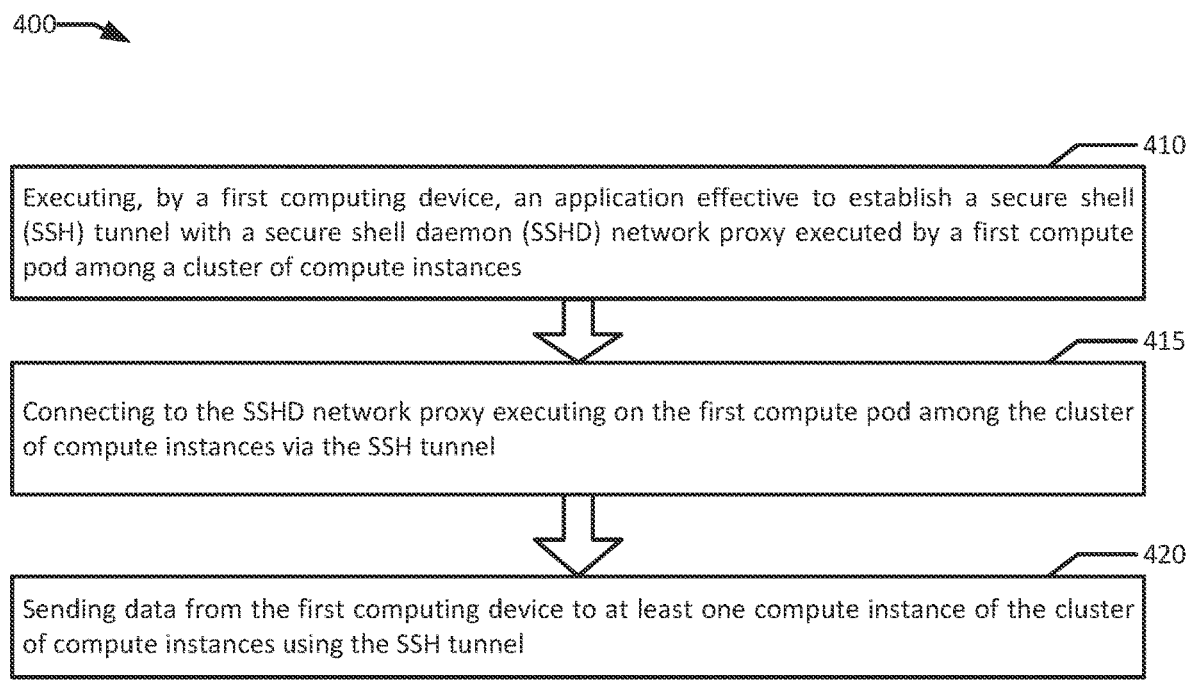
FIG. 4 is flowchart illustrating an example process for sending data to a cluster of compute instances, according to an example of the present disclosure.

FIG. 4 is flowchart illustrating an example process 400 for sending data to a cluster of compute instances, according to an example of the present disclosure. In various examples, the process 400 of FIG. 4 may be executed by at least one processor of an administrator device or system (e.g., administrator device 144). Although the example process 400 is described with reference to the flowchart illustrated in FIG. 4, it will be appreciated that many other methods of performing the acts associated with the process 400 may be used. For example, the order of some of the blocks may be changed, certain blocks may be combined with other blocks, blocks may be repeated, and some of the blocks described may be optional. The process 400 may be performed by processing logic that may comprise hardware (circuitry, dedicated logic, etc.), software, or a combination of both. In some examples, the actions described in the blocks of the process 400 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices.

In the example, process 400 may include executing, by a first computing device, an application effective to establish a secure shell (SSH) tunnel with a secure shell daemon (SSHD) network proxy executed by a first compute pod among a cluster of compute instances (block 410). For example, the first computing device may be an administrator device and/or system used to manage and/or maintain an SaaS offering deployed on the cluster of compute instances. The cluster of compute instances may be deployed on a private network, in some examples, such that the first computing device may be unable to access the cluster of compute instances using the Internet. The application may be a client-side process effective to execute SSH to initiate an SSH tunnel with an SSHD network proxy that is executing on the target cluster (e.g., by a compute pod deployed on the target cluster). The first compute pod may be among the cluster of compute instances insofar as the first compute pod is deployed on the cluster and may be executed by one compute instance or another depending on the current compute loads and/or state of the cluster.

In the example, process 400 may include connecting to the SSHD network proxy executing on the first compute pod among the cluster of compute instances via the SSH tunnel (block 415). The SSH process of the first computing device may initiate communication with the SSHD network proxy. SSH authentication may be used to authenticate the first computing device to the SSHD network proxy. After authentication the SSH tunnel may be established and may be used to securely communicate with the cluster of compute instances (via the SSHD network proxy deployed thereon).

In the example, process 400 may include sending data from the first computing device to at least one compute instance of the cluster of compute instances using the SSH tunnel (block 420). For example, the administrator device may use the established SSH tunnel to send and receive data to and from compute instances residing on the private network (via the SSHD network proxy). The SSH tunnel may be used to perform cluster management and/or maintenance tasks by an SRE.

Figure 5:
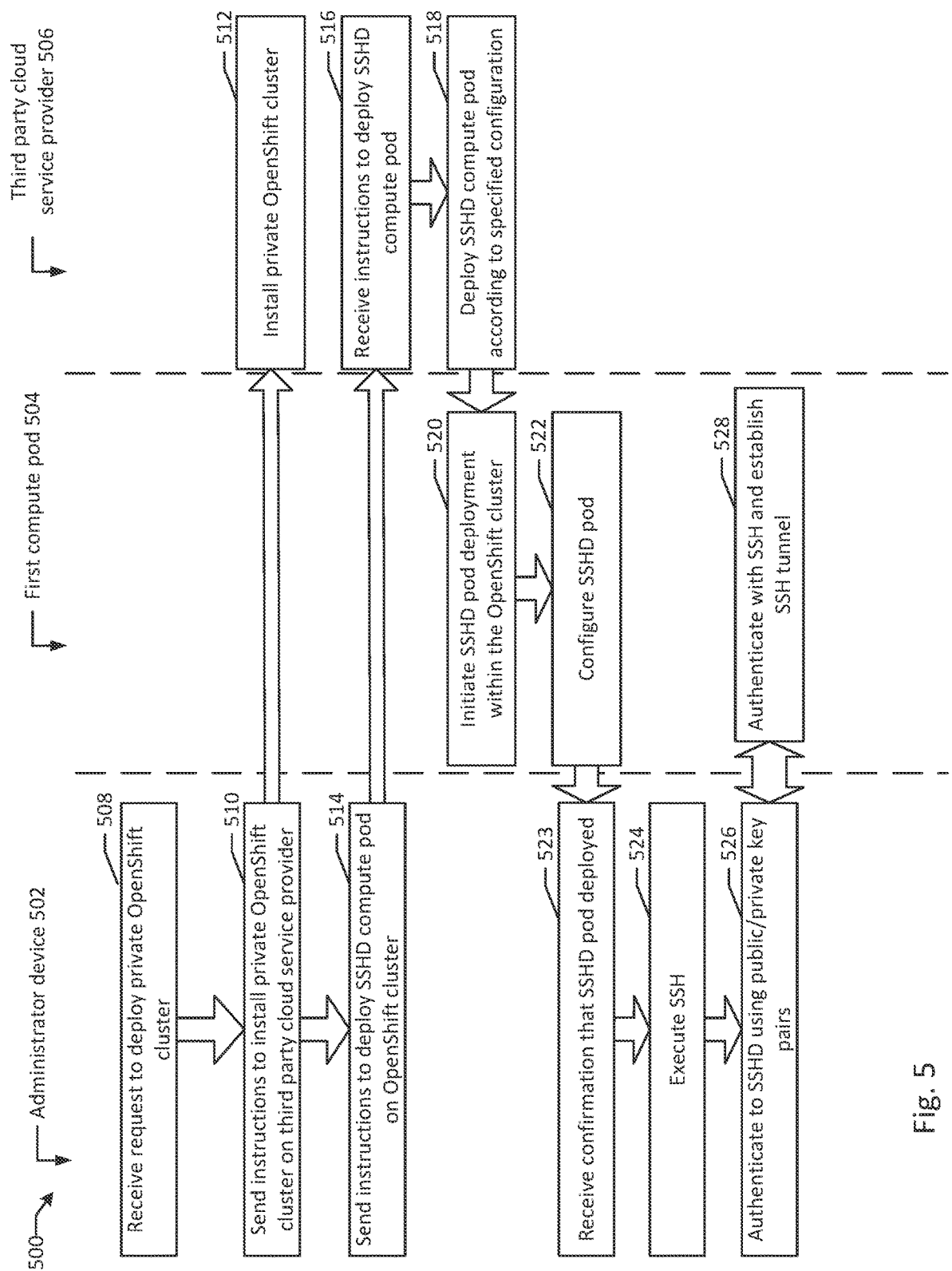
FIG. 5 illustrates a flow diagram of an example establishment of an SSH tunnel between an administrator device and a cluster of computing instances according to various aspects of the present disclosure.

FIG. 5 illustrates a flow diagram 500 of an example establishment of an SSH tunnel between an administrator device and a cluster of computing instances according to various aspects of the present disclosure. Although the examples below are described with reference to the flow diagram illustrated in FIG. 5, many other methods of performing the acts associated with FIG. 5 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both.

In the illustrated example flow diagram 500, an administrator device 502 may receive a request to deploy a private OpenShift® cluster (block 508). Although some of the examples described herein relate to managing OpenShift® clusters, the techniques described herein are also applicable to management of other SaaS deployments on third party cloud services. In an example, a customer may request that a SaaS offering be deployed using OpenShift® on their behalf and may request that an entity controlling the administrator device 502 manage the private cluster. The administrator device 502 may send instructions to install the private OpenShift® cluster on a third party cloud service providers networks (block 510). Third party cloud service provider 506 may receive the instructions and may install the private OpenShift® cluster (block 512). The OpenShift® cluster may be a container-based compute platform that may be used to deploy software (e.g., an SaaS offering). The administrator device 502 may send instructions to the third party cloud service provider 506 to deploy an SSHD compute pod on the installed OpenShift® cluster (block 514). In various examples, the OpenShift® cluster may receive instructions to deploy the SSHD compute pod. The deployment of the SSHD compute pod may specify the configuration of the compute pod and may include instructions effective to execute the SSHD network proxy. Accordingly, the OpenShift® cluster installed on the third party cloud service provider 506 may deploy the SSHD compute pod according to the specified configuration (block 518). The configuration may be specified in the deployment instructions received from administrator device 502.

Thereafter, the SSHD pod deployment may be initiated within the OpenShift® cluster (block 520) and may be instantiated as first compute pod 504 (block 520). The first compute pod 504 may configure the SSHD pod (block 522). In various examples, this may include opening ports and/or setting firewall flags to enable communication between the SSHD pod and the other compute instances of the OpenShift® cluster and/or communication between the SSHD pod and the administrator device 502. In various examples, the SSHD pod may authenticate itself to the authentication pod of the OpenShift® cluster.

The administrator device 502 may receive confirmation that the SSHD pod was deployed (block 523). At some point thereafter, the administrator device 502 may execute SSH (block 524). In various examples, an application installed on the administrator device 502 may be effective to initiate SSH communication with the SSHD network proxy of the first compute pod 504. The administrator device 502 may authenticate to SSHD using public/private key pairs (block 526). In various other examples, the administrator device 502 may authenticate using other authentication methods, depending on the desired type of authentication method for the particular implementation. The first compute pod 504 may authenticate with SSH and may establish the SSH tunnel with the administrator device 502 (block 528). Thereafter, administrator device 502 may send data traffic to different compute instances of the private OpenShift® cluster through the SSH tunnel.

Figure 6:
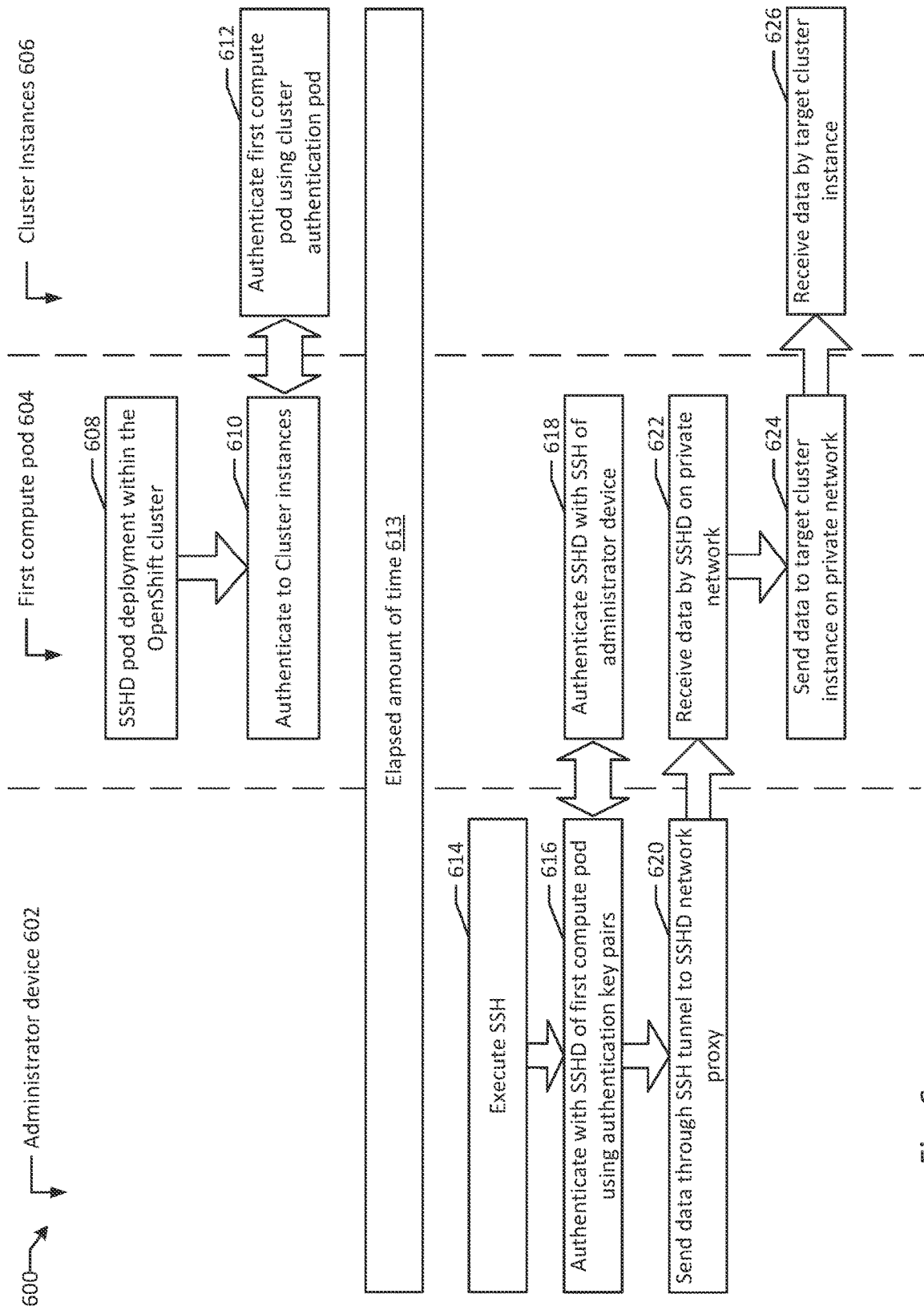
FIG. 6 illustrates a flow diagram of an example of sending data through an SSH tunnel to a cluster of computing instances according to various aspects of the present disclosure.

FIG. 6 illustrates a flow diagram 600 of an example of sending data through an SSH tunnel to a cluster of computing instances according to various aspects of the present disclosure. Although the examples below are described with reference to the flow diagram illustrated in FIG. 5, many other methods of performing the acts associated with FIG. 5 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both.

In an example, first compute pod 604 may be used to deploy an SSHD pod within an OpenShift® cluster (block 608). As previously mentioned, although some of the examples described herein relate to managing OpenShift® clusters, the techniques described herein are also applicable to management of other SaaS deployments on third party cloud services. The first compute pod 604 may authenticate to cluster instances of the OpenShift® cluster (or other cluster) (block 610). For example, the first compute pod 604 may use public/private key pairs and/or log-in information to authenticate to an authentication pod of the OpenShift® cluster.

Cluster instances 606 may authenticate the first compute pod using a cluster authentication pod (612). The cluster authentication pod may be a compute pod deployed within the cluster that handles authentication of compute instances and/or pods within the cluster. The particular authentication techniques used by the cluster authentication pod are implementation specific. After authentication of the first compute pod 604 including the SSHD network proxy, some amount of time may elapse (block 613).

In order to establish communication between administrator device 602 and cluster instances 606, administrator device 602 may execute SSH (block 614). In some examples, administrator device 602 may execute an application configured to initiate SSH. The administrator device 602 may authenticate with SSHD of the first compute pod using authentication key pairs (block 616). However, in various other examples, different authentication techniques (e.g., user name and password) may be used in order to authenticate the administrator device 602 to the SSHD network proxy of the first compute pod. The first compute pod 604 may authenticate the SSHD network proxy with the SSH of the administrator device to establish the SSH tunnel (block 618). Thereafter, the administrator device 602 may send data through the SSH tunnel to the SSHD network proxy (block 620). Any type of data may be sent. Typical examples may include requests for diagnostic information, troubleshooting request data, maintenance data, upgrades, etc.

The first compute pod 604 may receive the data using the SSHD network proxy executing on the private network (block 622). For example, the first compute pod 604 executing the SSHD network proxy may be deployed on the same cluster as the cluster instances 606, which may be a private cluster (e.g., a private OSD cluster). The first compute pod 604 may send data to the target cluster instance on the private network (block 624). For example, the data sent by the administrator device 602 may be directed to a particular compute instance among cluster instances 606. Accordingly, the data may be received by the SSHD network proxy executed by first compute pod 604 and may be sent on the private network to the target cluster instance among the cluster instances 606. The data may be received by the target cluster instance (block 626) from the SSHD network proxy.

Figure 7:
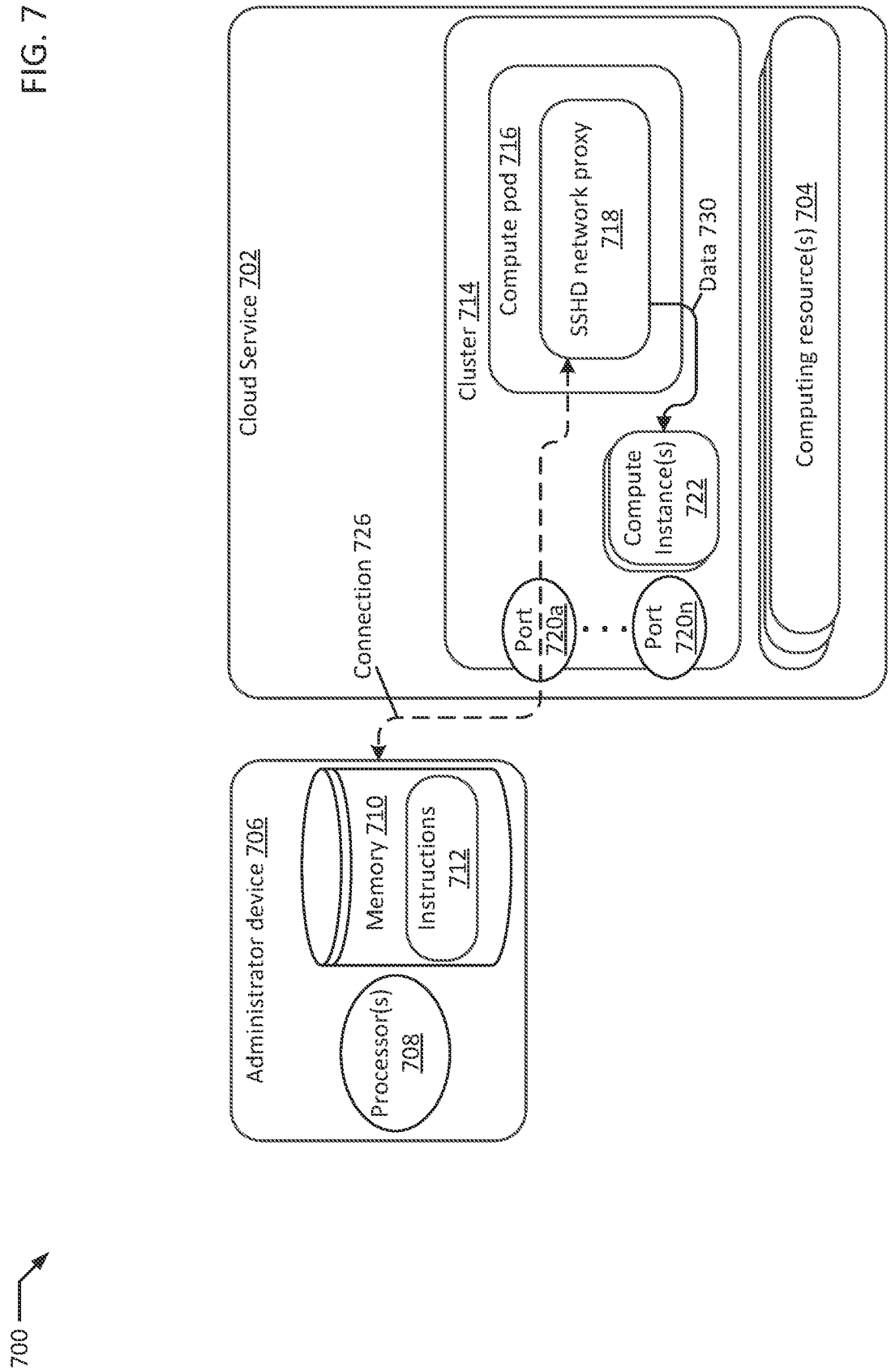
FIG. 7 is block diagram of an administrator device configured in communication with a compute pod deployed on a cluster of compute instances according to an example of the present disclosure.

FIG. 7 is block diagram of a system 700 comprising an administrator device 706 configured in communication with a compute pod 716 deployed on a cluster 714 of compute instances 722 according to an example of the present disclosure. In various examples, the cloud service 702 may be controlled by a third party with respect to an entity controlling administrator device 706. Cloud service 702 may comprise computing resources for applications hosted in data centers by cloud service providers such as Amazon Web Services (AWS), Google Cloud Platform (GCP), etc.

In some examples, a user may request that a cluster 714 be deployed on cloud service 702. The user may request that the cluster be managed by an entity controlling administrator device 706. Administrator device 706 (and/or another device) may install the cluster 714 on cloud service 702. The cluster 714 may include one or more compute instance(s) 722 configured in communication with one another. The compute instances 722 may be virtualized computing environments (e.g., containers and/or virtual machines) executing on computing resource(s) 704. The computing resource(s) 704 may be, for example, physical and/or virtualized computing environments controlled by the cloud service 702. Administrator device 706 may deploy a compute pod 716 on the cluster 714. The compute pod 716 may be configured by administrator device 706 to execute an SSHD network proxy 718.

The administrator device 706 may include one or more processor(s) 708 and non-transitory computer-readable memory 710. The non-transitory computer-readable memory 710 may include instructions 712 that may be used to perform the various techniques described herein. For example, the instructions may be configured to deploy and/or configure the compute pod 716 including the SSHD network proxy 718. For example, the instructions 712 may be used to cause the compute pod 716 to open one or more ports (e.g., ports 720a . . . 720n). The ports 720a . . . 720n may be used to communicate with the administrator device 706. In some examples, SSH may use only a single port (e.g., TCP/22). Further, in some examples, the instructions 712 may be configured to cause the administrator device 706 to establish connection 726 with the SSHD network proxy 718 through port 720a. The connection 726 may be between the administrator device 706 and the SSHD network proxy 718 of compute pod 716. In various examples, the administrator device 706 may send data 730 to at least one compute instance 722 using the connection 726.

All of the disclosed methods and/or procedures described herein may be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st example aspect of the present disclosure, a method comprises deploying a cluster of compute instances with a cloud compute service provider; deploying a first compute pod among the cluster of compute instances, the first compute pod configured to execute a secure shell daemon (SSHD) network proxy, wherein the first compute pod is configured to open ports to allow access to the cluster of compute instances by an authorized administrative user; establishing a connection between a first computing device executing a secure shell (SSH) process and the SSHD network proxy of the first compute pod; and sending data from the first computing device to at least one compute instance of the cluster of compute instances using the connection.

In accordance with a 2nd example aspect of the present disclosure, which may be used in combination with any one or more of other aspects described herein (e.g., the 1st aspect), wherein the cluster of compute instances deploys at least one software application and wherein the cluster is managed using a container application platform.

In accordance with a 3rd example aspect of the present disclosure, which may be used in combination with any one or more of other aspects described herein (e.g., the 1st aspect), wherein the cluster of compute instances is deployed on a private network that is inaccessible using the Internet.

In accordance with a 4th example aspect of the present disclosure, which may be used in combination with any one or more of other aspects described herein (e.g., the 1st aspect), wherein the first compute pod is configured to open the ports and internet protocol (IP) addresses that are associated with the authorized administrative user, wherein the ports and the IP addresses enable access by the authorized administrative user to the cluster of compute instances and software deployed by the cluster of compute instances.

In accordance with a 5th example aspect of the present disclosure, which may be used in combination with any one or more of other aspects described herein (e.g., the 1st aspect), further comprising executing, by the first computing device a client application configured to initialize the SSH process and the connection as an SSH tunnel.

In accordance with a 6th example aspect of the present disclosure, which may be used in combination with any one or more of other aspects described herein (e.g., the 1st aspect), further comprising performing SSH authentication for the SSH tunnel using a public-private key pair.

In accordance with a 7th example aspect of the present disclosure, which may be used in combination with any one or more of other aspects described herein (e.g., the 6th aspect), sending, by the first computing device to an authentication pod of the cluster of compute instances, authentication data configured to authenticate the first computing device to the cluster of compute instances; and authenticating, by the authentication pod, the first computing device to the cluster of compute instances.

In accordance with a 8th example aspect of the present disclosure, which may be used in combination with any one or more of other aspects described herein (e.g., the 7th aspect), further comprising sending the data from the first computing device, using the SSH tunnel, to the at least one compute instance of the cluster of compute instances via the SSHD network proxy, wherein the data is encrypted using a public key of the public-private key pair.

In accordance with a 9th example aspect of the present disclosure, which may be used in combination with any one or more of other aspects described herein (e.g., the 1st aspect), further comprising: deleting, by the first compute pod, configuration data of the SSHD network proxy, the configuration data defining open ports and/or firewall rules; and removing the first compute pod from the cluster of compute instances.

In accordance with a 10th example aspect of the present disclosure, which may be used in combination with any one or more of other aspects described herein (e.g., the 1st aspect), wherein the data comprises troubleshooting instructions and/or management instructions for a deployment of container management software managing the cluster of compute instances.

Aspects of the subject matter described herein may be useful alone or in combination with one or more other aspects described herein. In an 11th example aspect of the present disclosure, a system comprises a cloud service comprising a plurality of computing resources; and an administrator device, comprising: at least one processor; and non-transitory computer-readable memory storing instructions that, when executed by the at least one processor, are configured to: deploy a cluster of compute instances on the plurality of computing resources; deploy a first compute pod among the cluster of compute instances, the first compute pod configured to execute a secure shell daemon (SSHD) network proxy, wherein the first compute pod is configured to open ports to allow access to the cluster of compute instances by the administrator device; establish a connection with the SSHD network proxy of the first compute pod; and send data from the administrator device to at least one compute instance of the cluster of compute instances using the connection.

In accordance with a 12th example aspect of the present disclosure, which may be used in combination with any one or more of other aspects described herein (e.g., the 11th aspect), wherein a deployment of at least one software application on the cluster of compute instances is managed using a container application platform.

In accordance with a 13th example aspect of the present disclosure, which may be used in combination with any one or more of other aspects described herein (e.g., the 11th aspect), wherein the cluster of compute instances is deployed on a private network that is inaccessible from the Internet.

In accordance with a 14th example aspect of the present disclosure, which may be used in combination with any one or more of other aspects described herein (e.g., the 11th aspect), wherein the first compute pod includes configuration data specifying internet protocol (IP) addresses that are associated with the administrator device, wherein the IP addresses enable access by the administrator device to the cluster of compute instances and software deployed by the cluster of compute instances.

In accordance with a 15th example aspect of the present disclosure, which may be used in combination with any one or more of other aspects described herein (e.g., the 11th aspect), storing further instructions that, when executed by the at least one processor, are further effective to execute, by the administrator device, a client application configured to initialize the SSH process and the connection as an SSH tunnel.

In accordance with a 16th example aspect of the present disclosure, which may be used in combination with any one or more of other aspects described herein (e.g., the 11th aspect), storing further instructions that, when executed by the at least one processor, are further effective to perform SSH authentication for the SSH tunnel using a public-private key pair.

In accordance with a 17th example aspect of the present disclosure, which may be used in combination with any one or more of other aspects described herein (e.g., the 16th aspect), storing further instructions that, when executed by the at least one processor, are further effective to: send, by the administrator device to an authentication pod of the cluster of compute instances, authentication data configured to authenticate the administrator device to the cluster of compute instances; and authenticating, by the authentication pod, the administrator device to the cluster of compute instances.

In accordance with a 18th example aspect of the present disclosure, which may be used in combination with any one or more of other aspects described herein (e.g., the 17th aspect), storing further instructions that, when executed by the at least one processor, are further effective to send the data from the administrator device, using the SSH tunnel, to the at least one compute instance of the cluster of compute instances via the SSHD network proxy, wherein the data is encrypted using a public key of the public-private key pair.

In accordance with a 19th example aspect of the present disclosure, which may be used in combination with any one or more of other aspects described herein (e.g., the 11th aspect), storing further instructions that, when executed by the at least one processor, are further effective to: deleting, by the first compute pod, configuration data of the SSHD network proxy, the configuration data defining open ports and/or firewall rules; and remove the first compute pod from the cluster of compute instances.

In accordance with a 20th example aspect of the present disclosure, which may be used in combination with any one or more of other aspects described herein (e.g., the 11th aspect), wherein the data comprises troubleshooting instructions and/or management instructions for a deployment of container management software managing the cluster of compute instances.

Aspects of the subject matter described herein may be useful alone or in combination with one or more other aspects described herein. In an 21st example aspect of the present disclosure, a method comprises executing, by a first computing device, an application effective to establish a secure shell (SSH) tunnel with a secure shell daemon (SSHD) network proxy executed by a first compute pod among a cluster of compute instances; connecting to the SSHD network proxy executing on the first compute pod among the cluster of compute instances via the SSH tunnel; and sending data from the first computing device to at least one compute instance of the cluster of compute instances using the SSH tunnel.

In accordance with a 22nd example aspect of the present disclosure, which may be used in combination with any one or more of other aspects described herein (e.g., the 21st aspect), wherein the cluster of compute instances deploys at least one software application and wherein the cluster is managed using a container application platform.

In accordance with a 23rd example aspect of the present disclosure, which may be used in combination with any one or more of other aspects described herein (e.g., the 21st aspect), wherein the cluster of compute instances is deployed on a private network that is inaccessible using the Internet.

In accordance with a 24th example aspect of the present disclosure, which may be used in combination with any one or more of other aspects described herein (e.g., the 21st aspect), wherein the first compute pod is configured to open at least one port associated with an authorized administrative user, wherein the at least one port enables access by the authorized administrative user to the cluster of compute instances and software deployed by the cluster of compute instances.

In accordance with a 25th example aspect of the present disclosure, which may be used in combination with any one or more of other aspects described herein (e.g., the 21st aspect), further comprising performing SSH authentication for the SSH tunnel using a public-private key pair.

In accordance with a 26th example aspect of the present disclosure, which may be used in combination with any one or more of other aspects described herein (e.g., the 25th aspect), further comprising: sending, by the first computing device to an authentication pod of the cluster of compute instances, authentication data configured to authenticate the first computing device to the cluster of compute instances; and authenticating, by the authentication pod, the first computing device to the cluster of compute instances.

In accordance with a 27th example aspect of the present disclosure, which may be used in combination with any one or more of other aspects described herein (e.g., the 26th aspect), further comprising sending the data from the first computing device, using the SSH tunnel, to the at least one compute instance of the cluster of compute instances via the SSHD network proxy, wherein the data is encrypted using a public key of the public-private key pair.

In accordance with a 28th example aspect of the present disclosure, which may be used in combination with any one or more of other aspects described herein (e.g., the 21st aspect), further comprising: deleting, by the first compute pod, configuration data of the SSHD network proxy, the configuration data defining open ports and/or firewall rules; and removing the first compute pod from the cluster of compute instances.

In accordance with a 29th example aspect of the present disclosure, which may be used in combination with any one or more of other aspects described herein (e.g., the 21st aspect), wherein the data comprises troubleshooting instructions and/or management instructions for a deployment of container management software managing the cluster of compute instances.

Aspects of the subject matter described herein may be useful alone or in combination with one or more other aspects described herein. In an 30th example aspect of the present disclosure, a system comprises a means for deploying a cluster of compute instances with a cloud compute service provider; a means for deploying a first compute pod among the cluster of compute instances, the first compute pod configured to execute a secure shell daemon (SSHD) network proxy, wherein the first compute pod is configured to open ports to allow access to the cluster of compute instances by an authorized administrative user; a means for establishing a connection between a first computing device executing a secure shell (SSH) process and the SSHD network proxy of the first compute pod; and a means for sending data from the first computing device to at least one compute instance of the cluster of compute instances using the connection.

In accordance with a 31st example aspect of the present disclosure, which may be used in combination with any one or more of other aspects described herein (e.g., the 30th aspect), wherein the cluster of compute instances deploys at least one software application and wherein the cluster is managed using a container application platform.

In accordance with a 32nd example aspect of the present disclosure, which may be used in combination with any one or more of other aspects described herein (e.g., the 30th aspect), wherein the cluster of compute instances is deployed on a private network that is inaccessible using the Internet.

In accordance with a 33rd example aspect of the present disclosure, which may be used in combination with any one or more of other aspects described herein (e.g., the 30th aspect), wherein the first compute pod is configured to open the ports and internet protocol (IP) addresses that are associated with the authorized administrative user, wherein the ports and the IP addresses enable access by the authorized administrative user to the cluster of compute instances and software deployed by the cluster of compute instances.

Aspects of the subject matter described herein may be useful alone or in combination with one or more other aspects described herein. In an 34th example aspect of the present disclosure, a system comprises a cluster comprising a plurality of computing resources; a first compute pod deployed among the plurality of computing resources, the first compute pod configured to execute a secure shell daemon (SSHD) network proxy configured to open ports to allow access to the cluster by an authorized administrative user; and an administrator computing device configured to establish an SSH tunnel with the first compute pod.

In accordance with a 35th example aspect of the present disclosure, which may be used in combination with any one or more of other aspects described herein (e.g., the 34th aspect), wherein a deployment of at least one software application on the cluster of computing resources is managed using container application platform.

In accordance with a 36th example aspect of the present disclosure, which may be used in combination with any one or more of other aspects described herein (e.g., the 34th aspect), wherein the cluster of computing resources is deployed on a private network that is inaccessible from the Internet.

In accordance with a 37th example aspect of the present disclosure, which may be used in combination with any one or more of other aspects described herein (e.g., the 34th aspect), further comprising a second compute pod deployed among a second plurality of computing resources, the second compute pod configured to execute a second SSHD network proxy enabling communication between the administrator computing device and the second plurality of computing resources using a secure shell (SSH) process.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method comprising:
deploying a cluster of compute instances with a cloud compute service provider;
deploying a first compute pod among the cluster of compute instances, the first compute pod configured to execute a secure shell daemon (SSHD) network proxy, wherein the first compute pod is configured to open ports to allow access to the cluster of compute instances by an authorized administrative user;
establishing a connection between a first computing device executing a secure shell (SSH) process and the SSHD network proxy of the first compute pod;
sending data from the first computing device to at least one compute instance of the cluster of compute instances using the connection;
deleting, by the first compute pod, configuration data of the SSHD network proxy, the configuration data defining open ports and/or firewall rules; and
removing the first compute pod from the cluster of compute instances.

2. The method of claim 1, wherein the cluster of compute instances deploys at least one software application and wherein the cluster is managed using a container application platform.

3. The method of claim 1, wherein the cluster of compute instances is deployed on a private network that is inaccessible using the Internet.

4. The method of claim 1, wherein the first compute pod is configured to open the ports and internet protocol (IP) addresses that are associated with the authorized administrative user, wherein the ports and the IP addresses enable access by the authorized administrative user to the cluster of compute instances and software deployed by the cluster of compute instances.

5. The method of claim 1, further comprising executing, by the first computing device a client application configured to initialize the SSH process and the connection as an SSH tunnel.

6. The method of claim 1, further comprising performing SSH authentication for the connection using a public-private key pair, the connection comprising an SSH tunnel.

7. The method of claim 6, further comprising:
sending, by the first computing device to an authentication pod of the cluster of compute instances, authentication data configured to authenticate the first computing device to the cluster of compute instances; and
authenticating, by the authentication pod, the first computing device to the cluster of compute instances.

8. The method of claim 7, further comprising sending the data from the first computing device, using the SSH tunnel, to the at least one compute instance of the cluster of compute instances via the SSHD network proxy, wherein the data is encrypted using a public key of the public-private key pair.

9. The method of claim 1, further comprising:
deploying a second compute pod among a second plurality of computing resources, the second compute pod configured to execute a second SSHD network proxy enabling communication between the administrator computing device and the second plurality of computing resources using a second SSH process.

10. A system comprising:
a cloud service comprising a plurality of computing resources; and
an administrator device, comprising:
at least one processor; and
non-transitory computer-readable memory storing instructions that, when executed by the at least one processor, are configured to:
deploy a cluster of compute instances on the plurality of computing resources;
deploy a first compute pod among the cluster of compute instances, the first compute pod configured to execute a secure shell daemon (SSHD) network proxy, wherein the first compute pod is configured to open ports to allow access to the cluster of compute instances by the administrator device;
establish a connection with the SSHD network proxy of the first compute pod;
send data from the administrator device to at least one compute instance of the cluster of compute instances using the connection;
delete, by the first compute pod, configuration data of the SSHD network proxy, the configuration data defining open ports and/or firewall rules; and
remove the first compute pod from the cluster of compute instances.

11. The system of claim 10, wherein a deployment of at least one software application on the cluster of compute instances is managed using a container application platform.

12. The system of claim 10, wherein the cluster of compute instances is deployed on a private network that is inaccessible from the Internet.

13. The system of claim 10, wherein the first compute pod includes configuration data specifying internet protocol (IP) addresses that are associated with the administrator device, wherein the IP addresses enable access by the administrator device to the cluster of compute instances and software deployed by the cluster of compute instances.

14. The system of claim 10, storing further instructions that, when executed by the at least one processor, are further effective to execute, by the administrator device, a client application configured to initialize an SSH process and the connection as an SSH tunnel.

15. The system of claim 14, storing further instructions that, when executed by the at least one processor, are further effective to perform SSH authentication for the SSH tunnel using a public-private key pair.

16. The system of claim 15, storing further instructions that, when executed by the at least one processor, are further effective to:
send, by the administrator device to an authentication pod of the cluster of compute instances, authentication data configured to authenticate the administrator device to the cluster of compute instances; and
authenticate, by the authentication pod, the administrator device to the cluster of compute instances.

17. A non-transitory machine readable medium storing a program, which when executed by at least one processor causes the at least one processor to:
deploy a cluster of compute instances on a cloud service comprising a plurality of computing resources;
deploy a first compute pod among the cluster of compute instances, the first compute pod configured to execute a secure shell daemon (SSHD) network proxy, wherein the first compute pod is configured to open ports to allow access to the cluster of compute instances by an administrator device;
establish a connection with the SSHD network proxy of the first compute pod;

send data from the administrator device to at least one compute instance of the cluster of compute instances using the connection;

delete, by the first compute pod, configuration data of the SSHD network proxy, the configuration data defining open ports and/or firewall rules; and remove the first compute pod from the cluster of compute instances.

18. The non-transitory machine readable medium of claim 17, wherein a deployment of at least one software application on the cluster of compute instances is managed using a container application platform.

19. The non-transitory machine readable medium of claim 17, wherein the cluster of compute instances is deployed on a private network that is inaccessible from the Internet.

20. The non-transitory machine readable medium of claim 17, wherein the first compute pod includes configuration data specifying internet protocol (IP) addresses that are associated with the administrator device, wherein the IP addresses enable access by the administrator device to the cluster of compute instances and software deployed by the cluster of compute instances.

* * * * *